United States Patent
Pau

(10) Patent No.: US 11,573,428 B2
(45) Date of Patent: Feb. 7, 2023

(54) IMAGING METHOD AND APPARATUS USING CIRCULARLY POLARIZED LIGHT

(71) Applicant: ARIZONA BOARD OF REGENTS ON BEHALF OF THE UNIVERSITY OF ARIZONA, Tucson, AZ (US)

(72) Inventor: Stanley K. H. Pau, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 16/762,521

(22) PCT Filed: Nov. 8, 2018

(86) PCT No.: PCT/US2018/059873
§ 371 (c)(1),
(2) Date: May 8, 2020

(87) PCT Pub. No.: WO2019/094627
PCT Pub. Date: May 16, 2019

(65) Prior Publication Data
US 2020/0275078 A1    Aug. 27, 2020

Related U.S. Application Data

(60) Provisional application No. 62/583,301, filed on Nov. 8, 2017.

(51) Int. Cl.
*G02B 27/28* (2006.01)
*H04N 13/229* (2018.01)
(Continued)

(52) U.S. Cl.
CPC ............ *G02B 27/283* (2013.01); *G01S 17/89* (2013.01); *H04N 5/2254* (2013.01);
(Continued)

(58) Field of Classification Search
CPC .. G02B 27/283; G02B 5/3083; G02B 5/3016; G02B 27/286; G02B 27/28;
(Continued)

(56) References Cited

U.S. PATENT DOCUMENTS

| 4,987,410 A | 1/1991 | Berman |
| 6,982,829 B1* | 1/2006 | Berman ............... G02B 5/3016 |
| | | 348/E9.027 |

(Continued)

FOREIGN PATENT DOCUMENTS

| CN | 102244714 | 11/2011 |
| CN | 106464858 | 2/2017 |

(Continued)

OTHER PUBLICATIONS

Kim et al., "Imaging multispectral polarimetric sensor: single-pixel design, fabrication, and characterization" Applied Optics, vol. 42, No. 19, Jul. 1, 2003, pp. 3756-3764.

(Continued)

*Primary Examiner* — Thai Q Tran
*Assistant Examiner* — Nienru Yang
(74) *Attorney, Agent, or Firm* — Stuart H. Mayer; Mayer & Williams PC

(57) ABSTRACT

A three-dimensional imaging system includes at least one light source, a circular or elliptical polarization beamsplitter, a detector arrangement and an image processor. The light source is configured to provide light in a first circular or elliptical polarization state onto an object to be imaged. The circular or elliptical polarization beamsplitter is arranged to spatially separate the light reflected from an object into a first reflected portion in the first polarization state and a second reflected portion in the second polarization state. The first and second circular or elliptical polarization states are orthogonal to one another. The detector arrangement detects (Continued)

at least the first reflected portion of the light and the image processor is configured to generate image information from the detected first reflected portion.

19 Claims, 7 Drawing Sheets

(51) Int. Cl.
*H04N 5/225* (2006.01)
*G01S 17/89* (2020.01)
*G02B 5/30* (2006.01)

(52) U.S. Cl.
CPC ......... *H04N 5/2256* (2013.01); *H04N 13/229* (2018.05); *G02B 5/3083* (2013.01)

(58) Field of Classification Search
CPC .. H04N 13/229; H04N 5/2254; H04N 5/2256; H04N 5/225; G01S 17/89; G01S 7/499; G01S 17/42
USPC .......................................................... 348/49
See application file for complete search history.

(56) References Cited

U.S. PATENT DOCUMENTS

| | | | |
|---|---|---|---|
| 7,106,397 B1* | 9/2006 | Kawamoto | G02B 5/3016 349/96 |
| 7,800,755 B1 | 9/2010 | Poirier et al. | |
| 8,724,108 B2* | 5/2014 | Tan | G02B 27/283 356/364 |
| 8,749,886 B2 | 6/2014 | Gupta | |
| 9,116,243 B1 | 8/2015 | Brown | |
| 9,479,743 B2 | 10/2016 | Damstra | |
| 9,507,093 B2 | 11/2016 | Popp | |
| 2001/0003473 A1 | 6/2001 | Galabova et al. | |
| 2005/0083573 A1* | 4/2005 | Itoh | H04N 9/3167 359/485.06 |
| 2006/0098283 A1* | 5/2006 | Sato | G02B 5/3058 359/487.03 |
| 2007/0146632 A1 | 6/2007 | Chipman | |
| 2010/0134724 A1* | 6/2010 | Arakawa | G02B 5/3016 349/96 |
| 2011/0298918 A1* | 12/2011 | McEldowney | G02B 27/286 348/136 |
| 2015/0256733 A1* | 9/2015 | Kanamori | G02F 1/0136 348/234 |
| 2015/0301249 A1 | 10/2015 | Pau | |
| 2015/0312554 A1 | 10/2015 | Banks | |
| 2017/0248796 A1* | 8/2017 | Banks | G02B 26/001 |

FOREIGN PATENT DOCUMENTS

| | | |
|---|---|---|
| EP | 2277776 A2 | 5/2010 |
| EP | 2518529 A2 | 10/2012 |
| WO | 2010/144866 A2 | 12/2010 |
| WO | 2012/164392 A2 | 12/2012 |

OTHER PUBLICATIONS

Li, High quality three-dimensional (3D) shape measurement using intensity-optimized dithering techniquAs. Iowa State University. 2014.

Introduction to Liquid Crystals Chemistry and Physics by Peter J.Collings and Michael Hird, 2009, 5 pages.

* cited by examiner

IMAGING METHOD AND APPARATUS USING CIRCULARLY POLARIZED LIGHT

CROSS-REFERENCE TO RELATED APPLICATION

This application claims priority to U.S. Provisional Application Ser. No. 62/583,301, filed Nov. 8, 2017, the contents of which are incorporated herein by reference.

BACKGROUND

This document discloses a method and apparatus to measure three-dimensional (3D) images using circularly polarized light. The invention has applications in technologies such as remote sensing, surveillance, 3D scanning/imaging, industrial inspection, metrology, medical imaging, biometric authentication, object tracking, virtual reality, augmented reality and autonomous vehicles.

Polarization is a property of light wherein rays of light have different amplitudes in different directions. Our eyes can differentiate colors coming from an object but we cannot distinguish the different directions of polarization. Photographers often use polarizer in front of a camera to reduce glare and to improve contrast, but modern digital camera is polarization blind. A conventional color camera uses small color filters, such as red, green and blue color filters, to measure color information at different pixels. In order to image the polarization state of light, a polarization camera can use a small polarizer filter with dimensions equal to the size of the pixel.

One type of polarization is linear polarization. By definition, linear polarized light has an electric field that oscillates in a fixed direction. Another type of polarization is circular polarization. By definition, circular polarization of light has an electric field with constant magnitude and direction rotating with time in a plane perpendicular to the direction of propagation. The two types of circular polarization are right-handed circular (RHC) and left-handed circular (LHC) polarizations. Circularly polarized light is rare in nature. Mechanisms that generate circularly polarized light include total internal reflection, circular dichroism, and stress birefringence. Empirical observation in nature shows that the amount of circularly polarized light is generally low and almost non-existent. Most of the scattered light in both outdoor and indoor environments is either unpolarized or linearly polarized.

The polarization state of light can be described by the Stokes vector S, which consists of the four elements $S_0$, $S_1$, $S_2$, and $S_3$. $S_0$ represents the intensity of an optical field; $S_1$ and $S_2$ denote the affinity towards 0° and 45° linear polarization respectively; and $S_3$ expresses the difference between right and left circular polarizations. Using S the angle of linear polarization, degree of polarization (DOP), degree of linear polarization (DOLP), and degree of circular polarization (DOCP) can be calculated.

$$\theta_{linear} = \frac{1}{2}\tan^{-1}\frac{S_2}{S_1}$$

$$DOP = \sqrt{S_1^2 + S_2^2 + S_3^2}\Big/S_0$$

$$DOLP = \sqrt{S_1^2 + S_2^2}\Big/S_0$$

$$DOCP = S_3/S_0$$

SUMMARY

In one aspect, the subject matter disclosed herein relates to a method for obtaining a three-dimensional image of an object. In accordance with the method, light in a first circular or elliptical polarization state is directed onto an object to be imaged. A reflected portion of the light is received from the object. The reflected portion of the light is spatially separated into a first reflected portion in the first polarization state and a second reflected portion in a second polarization state that is orthogonal to the first circular or elliptical polarization state. At least the first reflected portion of the light is detected. Image information is generated from the detected first reflected portion.

In another aspect, the subject matter disclosed herein relates to a three-dimensional imaging system. The system includes at least one light source, a circular or elliptical polarization beamsplitter, a detector arrangement and an image processor. The light source is configured to provide light in a first circular or elliptical polarization state onto an object to be imaged. The circular or elliptical polarization beamsplitter is arranged to spatially separate the light reflected from an object into a first reflected portion in the first polarization state and a second reflected portion in the second polarization state. The first and second circular or elliptical polarization states are orthogonal to one another. The detector arrangement detects at least the first reflected portion of the light and the image processor is configured to generate image information from the detected first reflected portion.

In yet another aspect, the subject matter disclosed herein relates to a circular or elliptical beamsplitter that includes first and second prisms and a semi-reflecting thin film. The first prism includes an input face, an output face and an oblique face. The second prism includes an output face and an oblique face. The oblique face of the second prism is coupled to the oblique face of the first prism. The semi-reflecting thin film is disposed between the oblique face of the first prism and the oblique face of the second prism. The semi-reflecting thin film is configured to reflect light in a first circular or elliptical polarization state and transmit light in a second circular or elliptical polarization state. The first and second circular or elliptical polarization states are orthogonal to one another. Light received through the input face in a selected waveband and incident on the input face at a non-zero angle of incidence is split into two beams into the first and second circular or elliptical polarization states.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

The systems and techniques described herein are based in part on the observation that, in nature and in many indoor environments, the value of DOCP and $S_3$ are close to zero.

For many 3D imaging applications, the object of interest is illuminated by an active source of light that is unpolarized. Examples include light detection and ranging (LIDAR), imaging by structural illumination and flash photography. One of the key problems in these measurement techniques is the difficulty in distinguishing light originated from the illumination source (the signal) from background light (the noise). An accurate measurement requires a high signal-to-noise ratio (SNR) and good separation of the background light.

Figure 1:
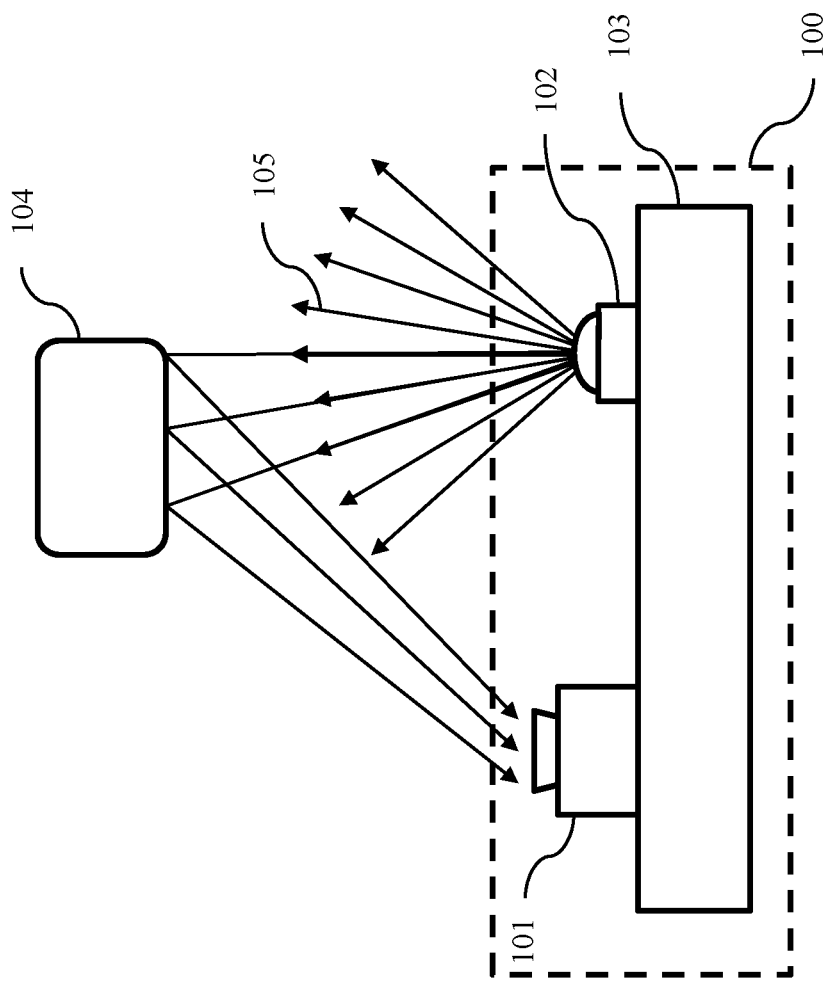
FIG. 1 shows a schematic diagram of one example of a 3D imaging device.

A 3D camera 100 is shown in FIG. 1. The system consists of a camera 101, a structured illuminator 102 and a computer controller 103 connecting to the illuminator and the camera, either by wire or by wireless connection. Structured light techniques are commonly used in computer vision and optical metrology. The structured light source usually includes a projector. A predetermined set of patterns 105, such as random or pseudorandom codifications, binary structured codifications, or grey scale n-ary codifications, are projected onto an object 104 and the reflection and/or scattered light from the projection of the object is measured. A computer is used to control the projector to display different patterns as a function of time and this is synchronized with the camera 101. An example of an image processing technique that may be used to convert the received data to depth information using structural illumination techniques may be found in F. Berryman et al., "A Theoretical Comparison of Three Fringe Analysis Methods for Determining the Three-Dimensional Shape of an Object in the Presence of Noise," Opt. Lasers Eng. 39 (2003) 35-50.

Figure 2:
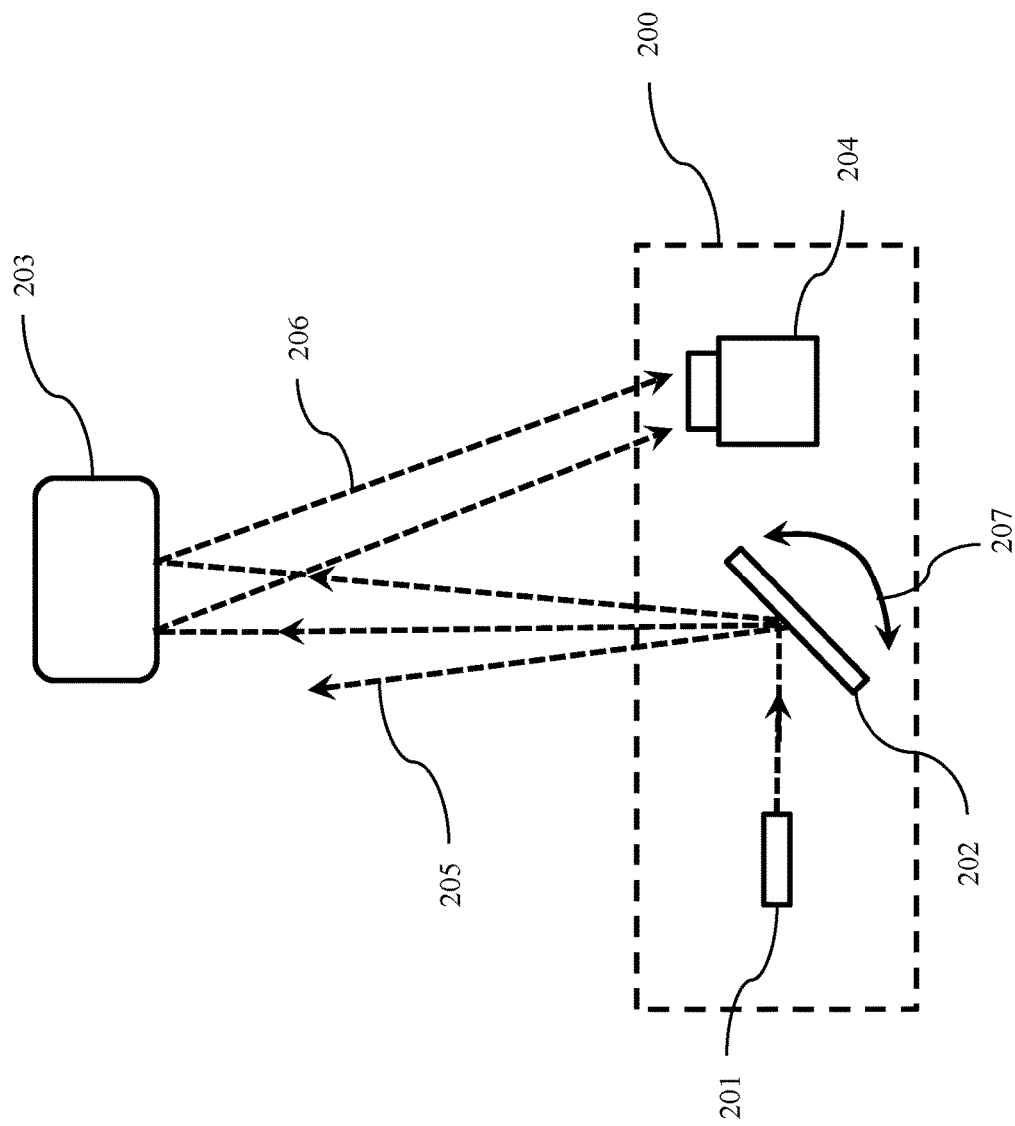
FIG. 2 shows a schematic diagram of another example of a 3D imaging device.

Another 3D camera 200 is shown in FIG. 2. The system includes a laser source 201, a mirror scanner 202 and a camera 204. The mirror scans through a range of directions 207. Light pattern 205 is projected onto an object 203. Reflected light 206 is measured by the camera 204.

Figure 3:
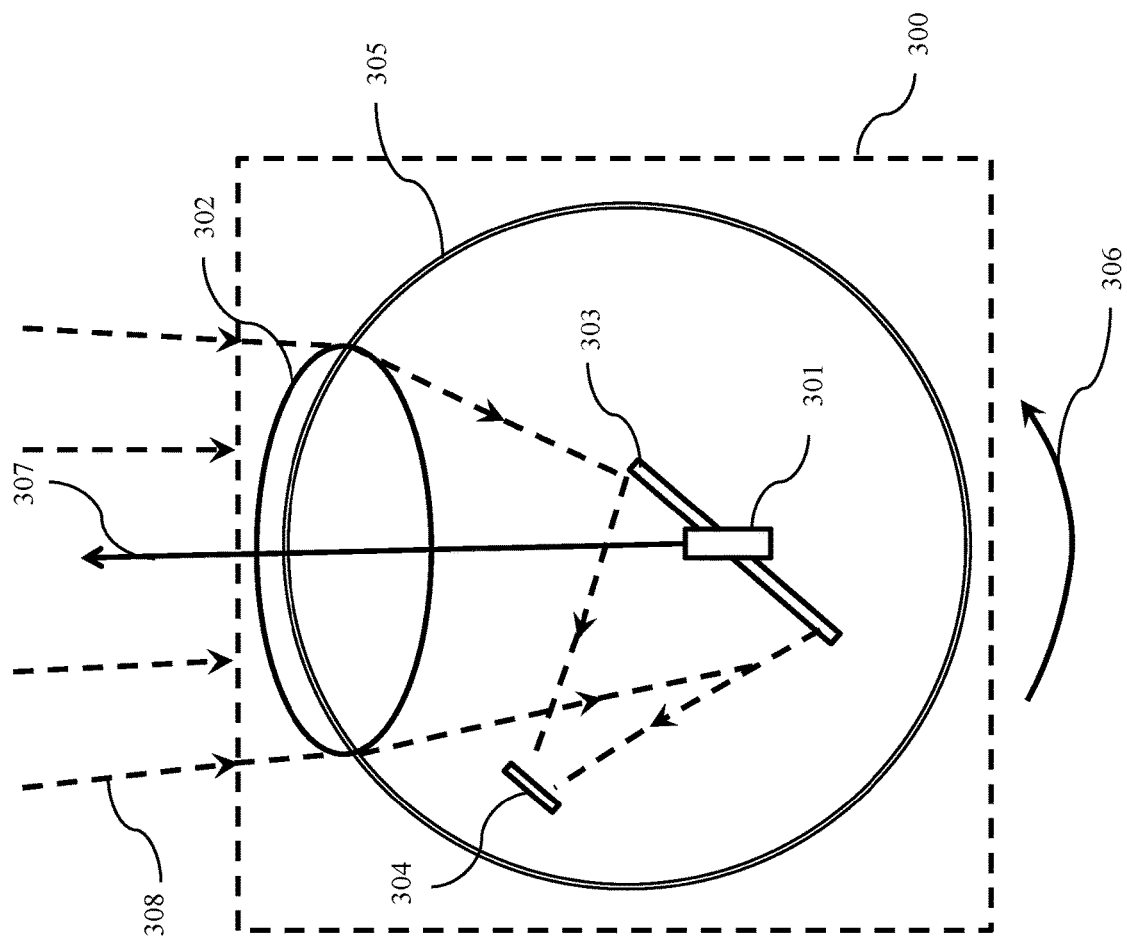
FIG. 3 shows a schematic diagram of one example of a LIDAR system.

A scanning LIDAR is shown in FIG. 3. The LIDAR 300 includes source 301, imaging optics 302, reflecting optics 303 and camera 304. The system is mounted on a rotational enclosure 305, which can be rotated in direction 306. An object is illuminated by light 307. Reflected and back scattered light 308 are collected by the LIDAR 300.

The subject matter disclosed herein utilizes a matching source that generates circularly polarized light and a matching detector arrangement that detects circularly polarized light. By using circularly polarized light, the SNR is expected to be high in the measurement of the reflected light, DOCP, and $S_3$ since much of the noise will be unpolarized or linearly polarized and hence will not be detected. In one implementation a laser can be used as the source. For many lasers, the output light is monochromatic and linearly polarized. The linearly polarized light can be converted to circularly polarized light by passing through a quarter wave retarder. Of course, alternative light sources, both monochromatic and polychromatic, may be used as well. In some embodiments the light source may include a structured illuminator that projects circularly polarized light with a predetermined pattern.

Figure 4:
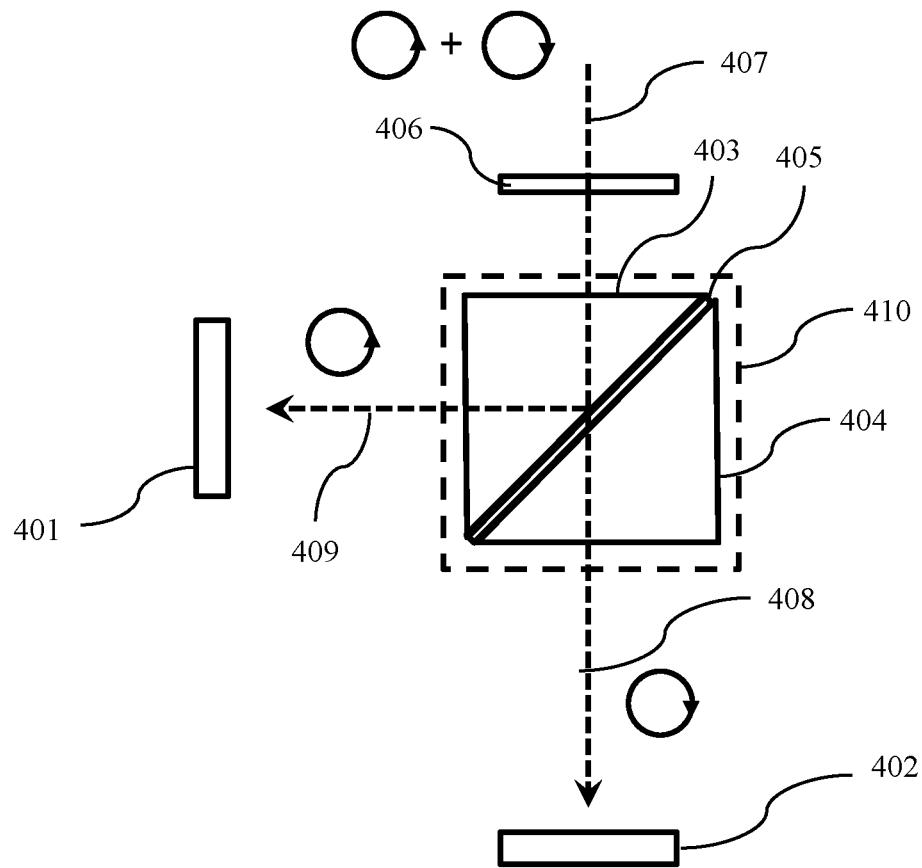
FIG. 4 shows a schematic diagram of one example of an imaging system for detecting circularly polarized light

The circularly polarized signal can be measured using the illustrative imaging system 400 shown in FIG. 4. An incoming signal 407 from an object being imaged passes through an optional color filter 406 and is incident on a polarization beamsplitter 410. The color filter has high transmission at the wavelength(s) of the source and low transmission at all the other wavelengths. In one embodiment, the polarization beamsplitter 410 is made of two right angle glass prisms 403 and 404 with a semi-reflecting thin film 405 sandwiched in between the two prisms. The thin film 405 can be made of cholesteric and/or nematic liquid crystal polymers, examples of which may be found in U.S. Pat. No. 9,671,538. Thin film cholesteric liquid crystal polymers have the unique optical property that they can reflect one circular polarization state and transmit another circular polarization state. Alternatively, the thin film 405 may include, for instance, a reflective polarization film such as a wire grid polarizer and a liquid crystal polymer film.

In one embodiment the semi-reflecting thin film 405 in the polarization beamsplitter 410 is a multi-layer thin film, which may comprise, for instance, an alignment polymer layer and a liquid crystal polymer layer. The polymers may be spin coated directly onto the glass prism. Alternatively, the polymer films can be pre-fabricated using roll-to-roll manufacturing and subsequently laminated onto the glass prism using an adhesion layer. Examples of alignment polymers that may be employed, include polyimide HD-4100 manufactured by HD MicroSystems (Parlin, N.J.) and ROP108 manufactured by Rolic Technologies Ltd. (Allschwil, Switzerland). Examples of liquid crystal polymers that may be employed include RMM800, a broadband cholesteric liquid crystal polymer, RMM141C, a nematic liquid crystal polymer and RMM1707, a high index $\Delta n$ nematic liquid crystal polymer, all of which are manufactured by EMD Performance Materials Corp. (Burlington, Mass.). In some embodiments, an anti-reflection coating can be applied to the facets of the beamsplitter to reduce optical loss at the wavelength of interest. In other embodiments, a plate beamsplitter may be utilized in place of a prism beamsplitter.

In contrast to existing polarization beamsplitters, which operate by separating light of different linear polarization states, the polarization beamsplitter 410 separates light of different circular polarization states. At least one of the two circular polarization states is detected by a detector. In the example of FIG. 4, the two orthogonal circularly polarized light components, 408 and 409, are detected separately by two detectors 401 and 402. An image map of the reflected light can be generated by an image processor (not shown) to generate image information from the data taken from the two detectors 401 and 402. Such image information may include a determination of parameters such as DOCP, S3, DOP, and DOLP.

Figure 5:
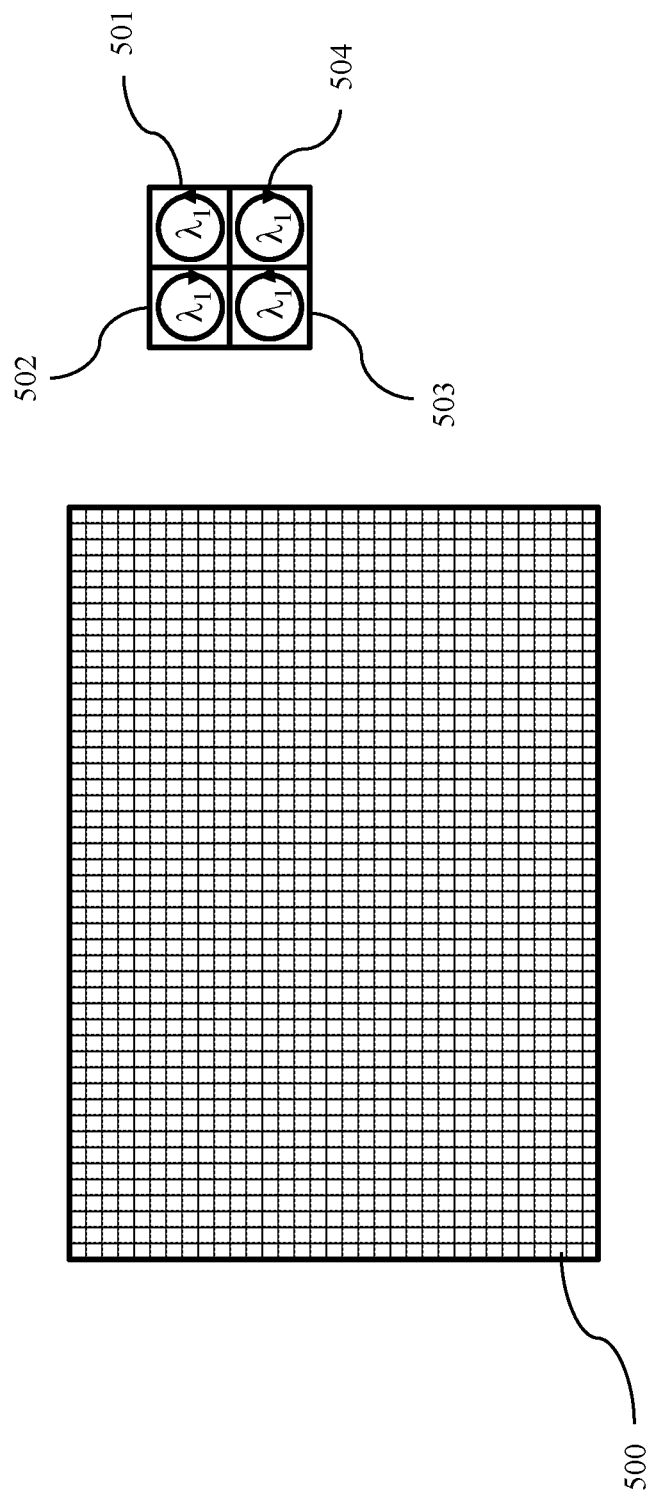
FIG. 5 shows a plan view of one example of a circular-polarization sensitive focal plane array.

In an alternative embodiment, instead of using the two detectors 401 and 402, the signal can be detected by a polarization sensitive focal plane array such as shown in FIG. 5. As shown, the polarization sensitive focal plane array 500 has an array of light sensitive pixels situated in e.g., a rectangular grid. An array of different circular polarizers is located over the pixels. A group of 4 pixels is shown separately. The 4 pixels have a circular polarizer on top and are sensitive to different circularly polarized light. For example, pixels 501 and 503 are sensitive to one circular polarization state at wavelength $\lambda 1$, and pixels 502 and 504 are sensitive to another circular polarization state at wavelength λ1. In this embodiment, in order to obtain a measurement of parameters such as $S_3$ at each pixel, it is necessary to interpolate the value of the circular polarization state not detected at a given pixel using the values obtained from pixels neighboring the given pixel which do detect that circular polarization state.

One particular example of a polarization sensitive focal plane array that may be employed is shown in U.S. patent application Ser. No. 14/953,272, which can be used to measure all or part of the components of the Stokes vector in a broad wavelength range.

For a fixed light source (e.g., laser) power, the advantage of increased SNR translates to an increase in operating distance. If, on the other hand, the operating distance is fixed, the advantage of increased SNR is translated to a reduction in the required operating power since a lower intensity light source may be used.

In some embodiments it may be desirable due to cost or the availability of optical components, such as source, polarizer, retarder or detector, to utilize orthogonal elliptically polarized light, instead of RHC and LHC light. A beamsplitter that can separate orthogonal elliptically polarized light can be made by sandwiching a multilayer cholesteric and/or nematic liquid crystal polymer and/or a polarizer film between two prisms. Examples of such a multilayer thin film are described in X. Tu, L. Jiang, M. Ibn-Elhaj, S. Pau, "Design, fabrication and testing of achromatic elliptical polarizer," Optics Express 25, 10355, 2017. For example, it may not be possible to generate, in a stable, efficient and reproducible way, a completely RHC light, and it may be easier to generate an elliptically polarized light that has a polarization state that is close to the RHC light.

Figure 6:
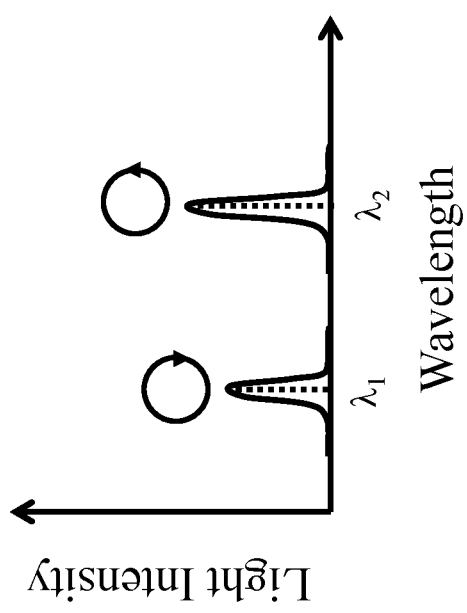
FIG. 6 illustrates the spectrum of a light source that includes two primary wavelengths with different circular polarization states.
Figure 7:
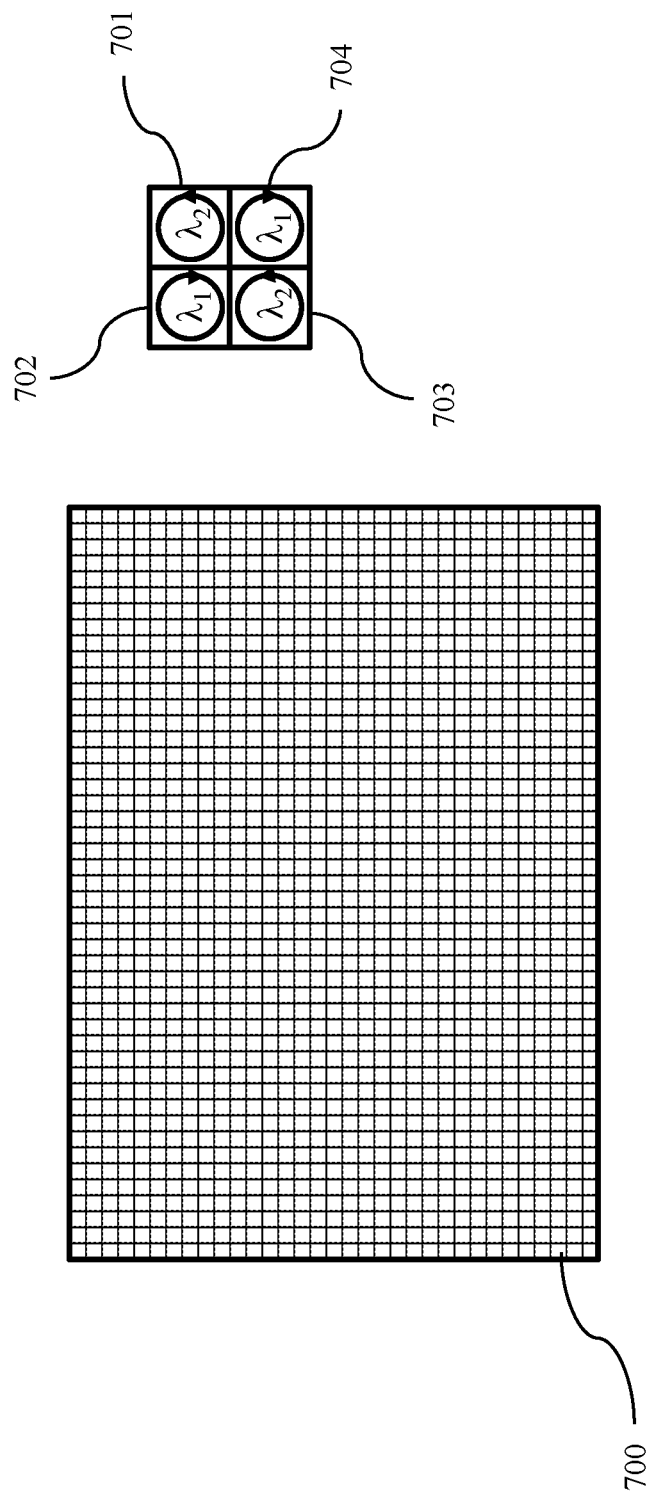
FIG. 7 shows a plan view of another example of a circular-polarization sensitive focal plane array.

In some embodiments, where an even higher SNR is required, the light source can be made of two primary wavelengths λ1 and λ2 of different circular or elliptical polarizations, for example RHC and LHC. One example of the spectrum of such a light source is shown in FIG. 6. The signal comprises reflected light of two wavelengths with different circular polarization states. An exemplary detector for this embodiment is a polarization sensitive focal plane array that is sensitive to the two primary wavelengths and to the two circular polarization states. One implementation of this focal plane array 700 is shown in FIG. 7. In FIG. 7 a group of 4 pixels is shown separately, with pixels 702 and 704 being sensitive to one circular polarization state at wavelength λ1, and pixels 701 and 703 being sensitive to another circular polarization state at wavelength λ2. In this way the detector is matched to the source.

While the examples of the imaging system described above have been illustrated as operating in optical wavelengths, more generally the imaging system may operate in any suitable portions of the electromagnetic spectrum such as near infrared and ultraviolet wavelengths, for instance.

The various embodiments of an imaging system described herein, such as imaging system 400 shown in FIG. 4, along with a suitable light source arrangement that provides circularly polarized light, may be employed in a wide variety of different camera systems including, without limitation, the 3D cameras shown in FIGS. 1 and 2 as well as the Scanning LIDAR system shown in FIG. 3.

As an example of an image that may be captured using the techniques described herein, consider a scene consisting of a brick building with windows against a blue sky. The building is illuminated with a circularly polarized light source in a scanning LIDAR system. Accordingly, circularly polarized light is scanned across the brick building. In this case, there is little light reflected back from the sky due to the weak back scattering of air. Light reflected back from the brick building is partially circularly polarized and is measured by the polarization sensitive detector incorporated in the scanning LIDAR system. The DOCP in the scene may be large due to the reflected circularly polarized light. Measurement of the phase or time delay of the signal from the circularly polarized light can provide a depth map of the brick building.

On the other hand, if the same scene was only illuminated with natural sunlight, the captured image would show a strong DOLP from the sky due to Mie scattering of the sunlight, a low DOLP from the brick surface and a medium DOLP from the windows due to Fresnel reflections. The image would also show very little DOCP due to the scarcity of circularly polarized light in the natural environment. Accordingly, when the image is captured using the techniques described herein using a circularly polarized light source and a circularly polarized sensitive detector, the signal-to-noise ratio of the measurement process can be significantly improved.

It should be noted that in the various embodiments of the imaging system described herein various conventional optical elements that may be employed in such systems have been omitted for clarity. Such optical elements may include, without limitation, collimators, focusing lenses, prisms, mirrors, filters and so on.

Although embodiments of imaging techniques and systems calibration have been described in language specific to features and/or methods, the appended claims are not necessarily limited to the specific features or methods described. Rather, the specific features and methods are disclosed as example implementations of imaging techniques and systems.

The invention claimed is:

1. A method of obtaining a three-dimensional image of an object, comprising:
   generating light in a first circular or elliptical polarization state using a light source;
   directing the light in the first circular or elliptical polarization state onto an object to be imaged;
   receiving a reflected portion of the light from the object;
   after receiving the reflected portion of the light from the object, spatially separating the reflected portion of the light from the object into a first reflected portion in the first polarization state and a second reflected portion in a second circular or elliptical polarization state that is orthogonal to the first circular or elliptical polarization state using a circular or elliptical polarization beamsplitter, the circular or elliptical polarization beamsplitter including:
   a first prism including an input face, an output face and an oblique face;
   a second prism including an output face and an oblique face, the oblique face of the second prism being coupled to the oblique face of the first prism;
   a semi-reflecting thin film disposed between the oblique face of the first prism and the oblique face of the second prism, the semi-reflecting thin film being configured to reflect light in the first circular or elliptical polarization state and transmit light in the second circular or elliptical polarization state, wherein light received through the input face in a selected waveband and incident on the input face at a non-zero angle of incidence is split into the first and second reflected portions, the thin film including a cholesteric liquid crystal polymer thin film layer and a nematic liquid crystal polymer;

detecting at least the first reflected portion of the light using a detector arrangement that matches the light source by detecting circularly or elliptically polarized light; and generating image information from the detected first reflected portion.

2. The method of claim 1, wherein detecting at least the first reflected portion of the light includes detecting the first and second reflected portions of the light and generating image information includes generating image information from the detected first and second reflected portions of the light.

3. The method of claim 2, wherein the light in the first and second circular or elliptical polarization states are located at a common wavelength.

4. The method of claim 2, wherein the light in the first and second circular or elliptical polarization states are located at different wavelengths.

5. The method of claim 1, wherein directing the light in the first circular or elliptical polarization state includes generating the light from a single source and manipulating the light so that it is in the first circular or elliptical polarization state using one or more optical elements.

6. The method of claim 5, wherein the one or more optical elements include an optical retarder.

7. The method of claim 1, wherein the light is structured light that projects a predetermined pattern.

8. The method of claim 1, wherein the imaging information includes a difference between the first and second circular or elliptical polarization states.

9. A three-dimensional imaging system, comprising:
at least one light source configured to provide light in a first circular or elliptical polarization state onto an object to be imaged;
a circular or elliptical polarization beamsplitter arranged to spatially separate the light reflected from the object to be imaged into a first reflected portion in the first circular or elliptical polarization state and a second reflected portion in the second circular or elliptical polarization state, the first and second circular or elliptical polarization states being orthogonal to one another;
a detector arrangement that matches the light source by detecting at least the first reflected portion of the light in the first circular or elliptical polarization state; and
an image processor configured to generate image information from the detected first reflected portion, wherein the circular or elliptical polarization beamsplitter includes:
a first prism including an input face, an output face and an oblique face;
a second prism including an output face and an oblique face, the oblique face of the second prism being coupled to the oblique face of the first prism;
a semi-reflecting thin film disposed between the oblique face of the first prism and the oblique face of the second prism, the semi-reflecting thin film being configured to reflect light in the first circular or elliptical polarization state and transmit light in the second circular or elliptical polarization state, wherein the light reflected from the object received through the input face in a selected waveband and incident on the input face at a non-zero angle of incidence is split into the first and second reflected portions, the thin film including a cholesteric liquid crystal polymer thin film layer and a nematic liquid crystal polymer thin film layer.

10. The imaging system of claim 9, wherein the detector arrangement is configured to detect the first and second reflected portions of the light and the image processor is configured to generate image information from the detected first and second reflected portions of the light.

11. The imaging system of claim 10, wherein the detector arrangement includes a polarization sensitive focal plane array having first pixels that detect light in the first circular or elliptical polarization state and second pixels that detect light in the second circular or elliptical polarization states.

12. The imaging system of claim 10, wherein the light in the first and second circular or elliptical polarization states are located at a common wavelength.

13. The imaging system of claim 10, wherein the light in the first and second circular or elliptical polarization states are located at different wavelengths.

14. The imaging system of claim 13, wherein the detector arrangement includes a polarization sensitive focal plane array having first pixels that detect light at a first wavelength in the first circular or elliptical polarization state and second pixels that detect light at a second wavelength in the second circular or elliptical polarization states, wherein the first and second wavelengths are different wavelengths.

15. The imaging system of claim 14, wherein the one or more optical elements include an optical retarder.

16. The imaging system of claim 9, wherein the at least one light source includes a single light source generating linearly polarized light and one or more optical elements for converting the linearly polarized light to circularly polarized light or elliptically polarized light.

17. The imaging system of claim 9, wherein the at least one light source includes a structured illuminator.

18. A circular or elliptical beamsplitter comprising:
a first prism including an input face, an output face and an oblique face;
a second prism including an output face and an oblique face, the oblique face of the second prism being coupled to the oblique face of the first prism;
a semi-reflecting thin film disposed between the oblique face of the first prism and the oblique face of the second prism, the semi-reflecting thin film being configured to reflect light in a first circular or elliptical polarization state and transmit light in a second circular or elliptical polarization state, the first and second circular or elliptical polarization states being orthogonal to one another, wherein light received through the input face in a selected waveband and incident on the input face at a non-zero angle of incidence is split into two beams into the first and second circular or elliptical polarization states, the thin film including a cholesteric liquid crystal polymer thin film layer and a nematic liquid crystal polymer thin film layer.

19. The beamsplitter of claim 18, wherein the thin film includes a multilayer cholesteric and/or nematic liquid crystal polymer thin film and/or a polarizer thin film.

* * * * *